United States Patent [19]

Bemis et al.

[11] Patent Number: 5,709,828

[45] Date of Patent: Jan. 20, 1998

[54] METHOD OF FABRICATING A FOAMED INTERIOR TRIM PRODUCT

[75] Inventors: Claude E. Bemis, York, Me.; Craig B. Labrie, Dover; Norman J. Clavette, Rollinsford, both of N.H.

[73] Assignee: Davidson Textron Inc., Dover, N.H.

[21] Appl. No.: 548,643

[22] Filed: Oct. 26, 1995

[51] Int. Cl.[6] ............... B29C 44/06; B29C 44/12
[52] U.S. Cl. ............ 264/46.5; 264/46.6; 264/276; 425/812
[58] Field of Search .............. 425/812; 264/46.6, 264/46.5, 276

[56] References Cited

U.S. PATENT DOCUMENTS

| | | | |
|---|---|---|---|
| 4,501,541 | 2/1985 | Bethell et al. | 425/117 |
| 4,542,887 | 9/1985 | Bethell et al. | 425/812 |
| 4,562,032 | 12/1985 | Gaudreau | 264/338 |
| 4,793,784 | 12/1988 | Belleville et al. | 425/111 |
| 4,959,184 | 9/1990 | Akai et al. | 264/46.6 |
| 5,017,115 | 5/1991 | Yanagishita et al. | 425/125 |
| 5,083,912 | 1/1992 | Beck | 425/812 |
| 5,098,271 | 3/1992 | Yanagishita | 425/812 |
| 5,110,085 | 5/1992 | Iwasawa | 425/812 |
| 5,132,063 | 7/1992 | Hughes | 264/46.6 |
| 5,234,639 | 8/1993 | Smith | 264/46.6 |
| 5,281,383 | 1/1994 | Ueki et al. | 425/812 |

*Primary Examiner*—Allan R. Kuhns
*Attorney, Agent, or Firm*—Reising, Ethington, Barnard & Perry

[57] ABSTRACT

A vehicle interior trim component, such as a glove compartment or console door, and its method of fabrication includes an outer flexible shell having a peripheral contoured return flap captured within a peripheral gap provided between insert and backing panels of the component. Foam is injected into a space between the outer shell and insert panel and any gases and excess foam are allowed to escape from the foam space into an adjacent overflow chamber in a controlled manner through the gap while the return flap seals the assembly against external leakage of such excess foam.

6 Claims, 2 Drawing Sheets

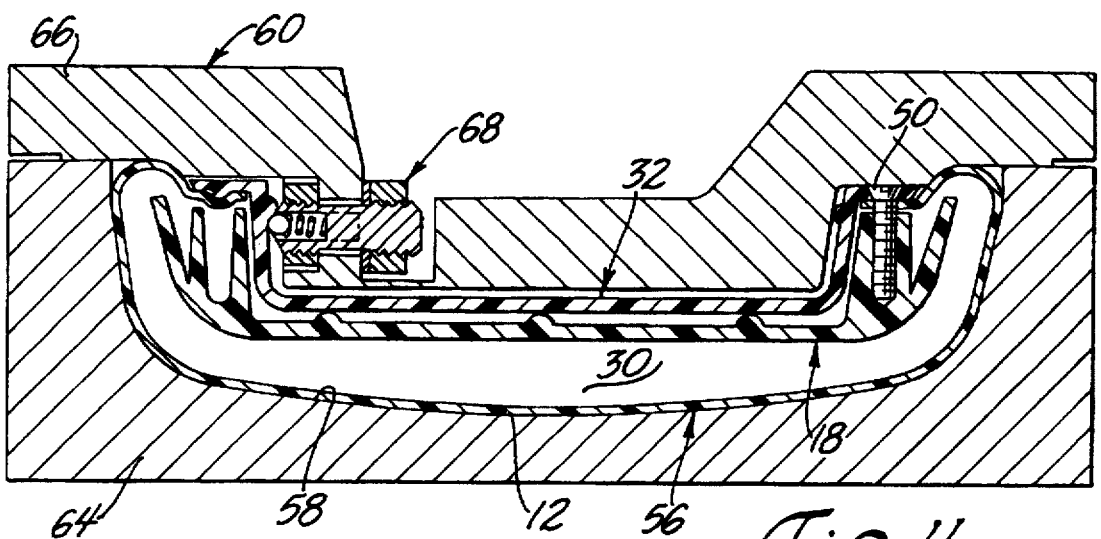
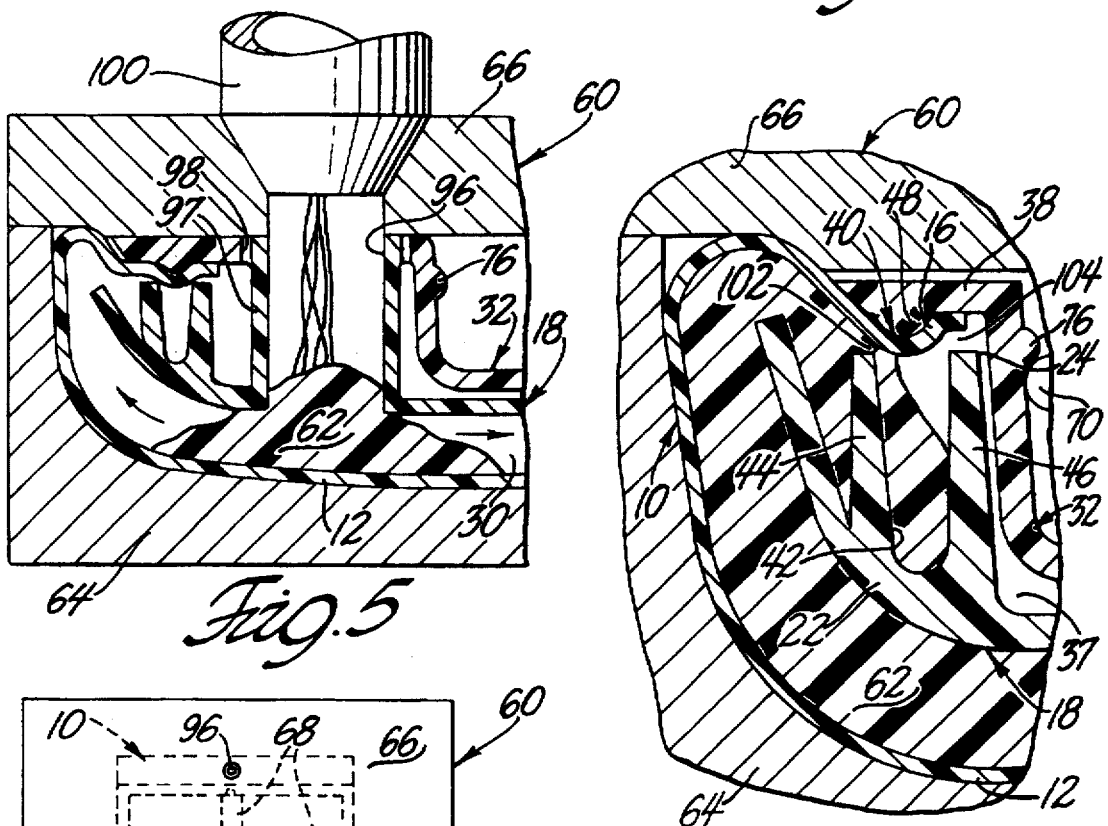
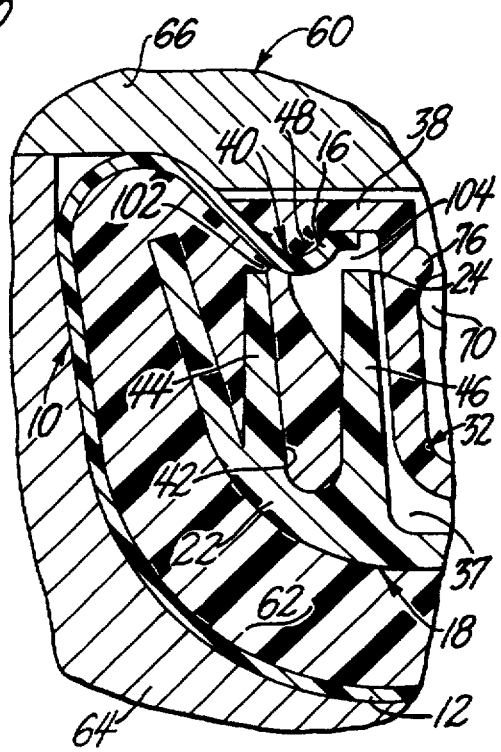
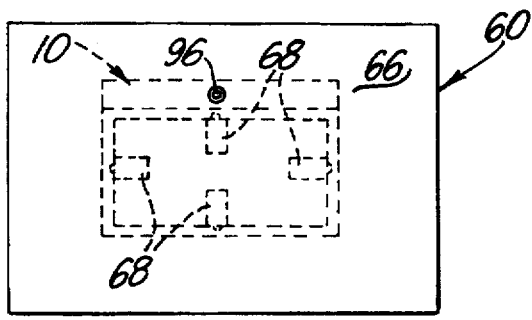

METHOD OF FABRICATING A FOAMED INTERIOR TRIM PRODUCT

This invention relates to foamed interior trim products for the interior of an automotive vehicle and to methods of fabricating such products.

BACKGROUND OF THE INVENTION

Vehicle interior trim components, such as console lids, armrests, glove compartment doors, and the like, are known which include an outer flexible shell connected by a backing layer of cellular foam to a rigid insert and joined to a separater backplate by suitable fastening means to form an article that appears finished on both the interior and exterior portions of the final article.

A known method for fabricating such components involves lining a properly shaped mold cavity with the outer shell and positioning the insert within the mold above the skin to leave a foam space therebetween in which liquid polyurethane foam is reacted to generate a foam backing layer between the shell and insert. In this arrangement, a so-called return flap on the edge of the shell is wrapped around the peripheral edge of the insert and held between the insert and the adjacent wall of the molding apparatus. As the foam core material reacts and expands in the foam space, it forces any gases and excess foam out of the foam space past the return flap of the shell where it is deposited as a thin skin or flash across the backside surface of the insert and adjacent outer surface of the shell as well as against the mold cavity wall. The foam flashing must be removed from shell and insert to enable the backing panel to be attached in a subsequent post-molding operation. At present, there is no good way of removing the foam flashing from the insert and shell other than with special machinery and/or by manual labor, both of which are tedious, costly non-value added steps in the process. Any excess foam remaining in the mold cavity of the molding apparatus must also be removed before commencing the next molding cycle. In an effort to simplify the removal process, it is present practice to wax the surface of the mold as well as the surfaces of the shell and insert to provide non-adherent surfaces for the foam flashing. Waxing however, introduces, still more non-value added steps in the manufacturing process of having to apply and then remove the wax from the parts and mold tool.

SUMMARY OF THE INVENTION AND ADVANTAGES

A vehicle interior trim component and method of manufacture, is provided which eliminates external foam leakage and hence dispenses with non-value added functions of picking excess foam from the parts and mold and waxing and cleaning the parts and mold surfaces.

According to the present invention, the skin, insert and backing panels are assembled prior to foaming the core in place between the shell and insert. The return flap of the skin is extended around to the backside of the insert to envelop a foam space between the skin and insert, as before. However, before molding, the backing panel is attached to the insert to trap the peripheral return flap of the shell in a peripheral gap between the panels for communication with an overflow chamber now formed between the panels. During foaming of the core, any gases and excess foam are permitted to escape from the foam space through the peripheral gap between the return flap and insert where they are directed into the overflow chamber. The flap additionally serves as a seal preventing the excess foam from leaking out of the assembly past the return flap and backing panel so as to contain the excess foam within the assembly.

One of the primary advantages this invention provides is the elimination of the non-valve added operations associated with the prior know process discussed above including the waxing, picking and cleaning operations, since the excess foam is contained within the assembly. Thus, a large cost, labor and time savings is realized.

These and other features and advantages of the present invention will be readily appreciated as the same becomes better understood by reference to the following detailed description and accompanying drawings, wherein:

BRIEF DESCRIPTION OF THE DRAWINGS

FIG. 4 is a view like FIG. 3 but with the mold tool closed and the intermediate assembly supported within a cavity of the mold tooling;

FIG. 5 is an enlarged diagrammatic sectional view of a portion of the trim component taken along lines of 5—5 of FIG. 1 shown supported within the mold cavity during injection of the foam core material;

FIG. 6 in an enlarged fragmentary cross-sectional view of the trim component illustrating the flow of excess foam from the foam space into the overflow chamber; and FIG. 7 diagrammatic plan view of the mold tooling and the component support system.

DETAILED DESCRIPTION

The article of the present invention and its method of manufacture are described below with reference to a composite plastic door such as glove compartment door or a console lid for use in association with the interior body assembly of automotive vehicle. It is to be understood, however, that the invention is applicable to other interior trim components, such as door panels, instrument panel pads, arm rests and the like having a foamed-in-place core, that backs, an outer flexible skin and is reinforced by a mold insert secured to a backplate.

Figure 1:
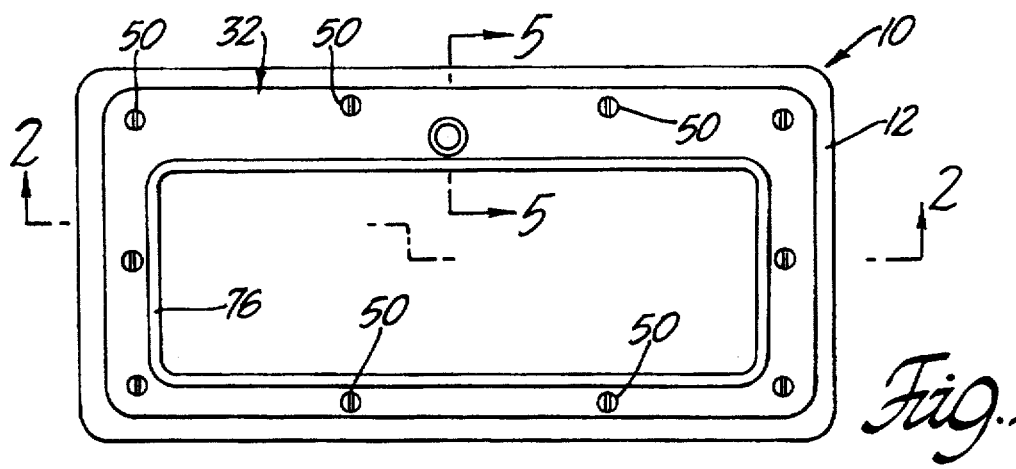
FIG. 1 is a bottom view of an interior trim component constructed according to a presently preferred embodiment of the invention.
Figure 2:
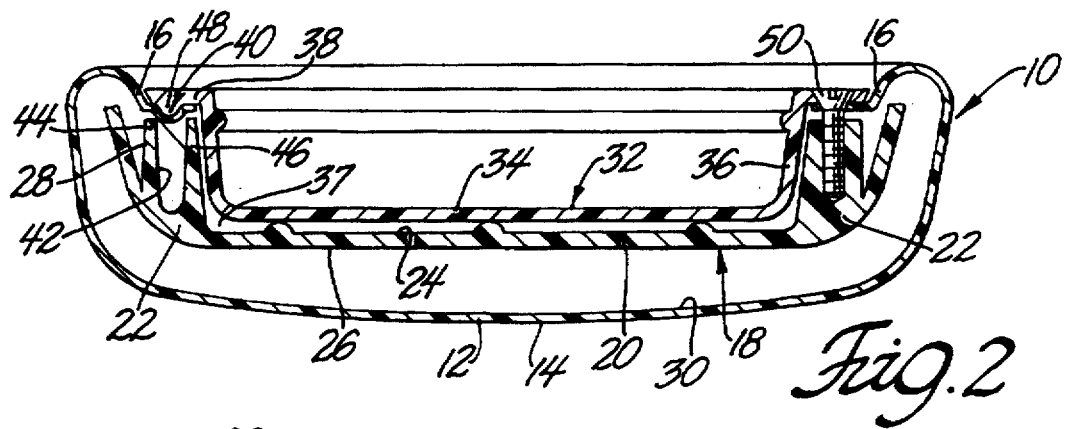
FIG. 2 is cross-sectional view taken along lines 2—2 of FIG. 1.

FIGS. 1 and 2 show a representive console door trim component 10 which includes and outer shell or skin 12 of flexible interior trim cover material, such as a flexible grained polyvinyl chloride material which can be formed by a process of the types set forth in U.S. Pat. No. 4,562,032 thereby to produce and retain a highly grained appearance on the exterior shell face 14. The shell 12 has a peripheral margin or return flap portion 16 that is inwardly directed and formed to have a tortious or sinuous transverse cross-sectional shape for reasons to be explained below.

A mold insert panel 18 is a preformed plastic part made separately from the skin 12 and is formed with a central planer region 20 encircled by an upstanding parametrical wall 22 on an outer backside 24 of the insert 18. The insert 18 is positioned within the shell 12 such that an inner frontside 26 of the insert 18 is spaced from the shell 18 and the return flap 16 extends around a peripheral edge 28 of the insert and over the backside wall 22 of the insert to envelop a foam space 30 between the shell 12 and the front side 26 of the insert 18.

A backing panel or backplate 32 is a rigid plastic part that is formed separately from the shell 12 and insert 18 and is shaped to complement the insert to enable the panels 18, 32 to be joined together. The backing panel 32 has a central depressed planar region 34 that is positioned in spaced, generally parallel relation to the backside surface 24 of the planer region 20 of the insert 18. The region 34 is encircled by an upstanding parametrial wall 36 that is generally coextensive with and spaced interiorally from the wall 22 of the insert 18 to provide a venting space 37 between the panels 18, 32. The wall 36 terminates in a radially outwardly extending parametrial flange 38 that extends over and is spaced laterally from the backside of the wall 22 of the insert to define a peripheral gap 40 (FIG. 6) therebetween in which the return flap 16 of the shell 12 is trapped.

As illustrated best in FIG. 6, a peripheral channel 42 extends into the wall 22 of the insert 18 from the backside 24 defining a peripheral overflow chamber 42 lying beneath the return flap 16 and bifurcating the wall 22 to provide a pair a radially outer and inner laterally spaced ridge projections 44, 46 of the wall 22 that are generally coextensive with the peripheral return flap 16 about its circumference and spaced longitudinally from the opposing flange 38 of the backing panel 32. The flange 38 has a complementary circumferential ridge projection 48 that lies opposite the channel 42 between the projections 44, 46 providing tortuous, sinuous transverse shape to the gap 40 corresponding to generally to that of the return flap 16. The spacing between the backing panel ridge 48 and each of the coacting ridge projections 44, 46 is slightly greater than the thickness of the return flap 16 to provide a small amount of clearance (e.g., 0.04 inches) between the return flap 16 and the ridge projections, 44, 46 to provide a constricted flow path from the foam space 30 into the overflow chamber 42 and from the chamber 42 into the adjacent vent space 37 between the panels 18, 32.

The backing panel 32 is secured to the insert panel 18 by plurality of screw fasteners 50 extending through the backing panel 32 into associated mounting bosses arranged at prescribed locations along the channel 42.

Figure 3:
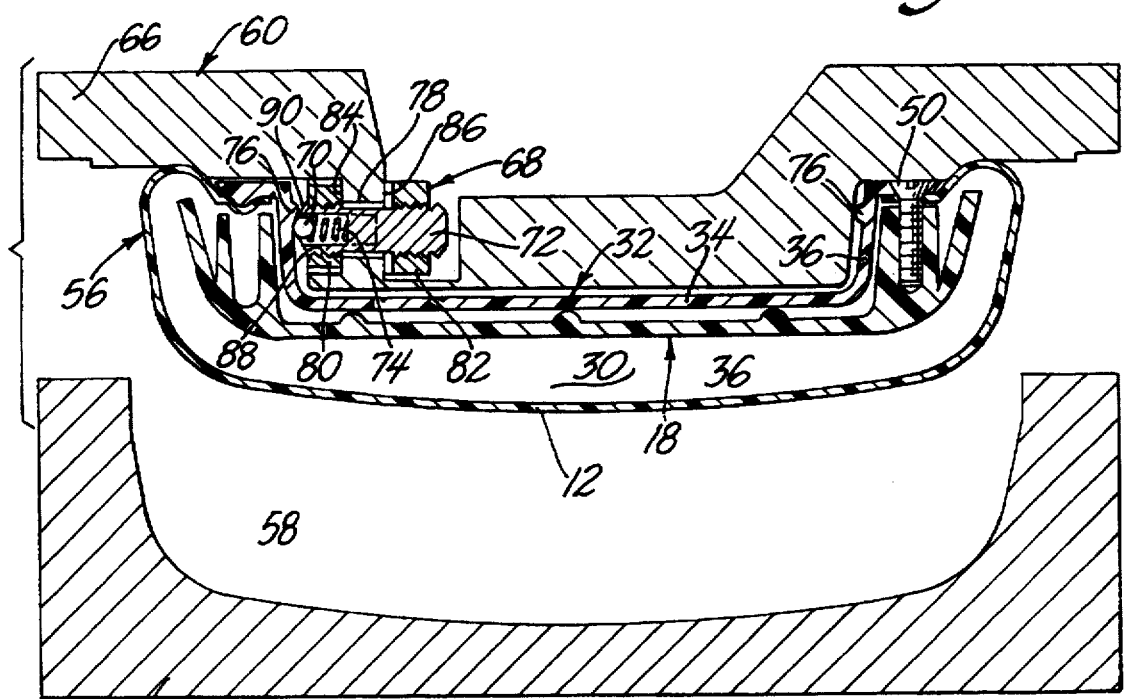
FIG. 3 is diagrammatic sectional view of mold tooling with an intermediate assembly of the trim component shown releasably supported by a lid of the tooling.

Following the preassembly of the shell 12 and the panels 18, 32, the intermediate assembly 56 of these components (FIG. 3) is positioned within an appropriately shaped mold cavity 58 of mold tooling 60 to produce a foam core 62 within the foam space 30. A diagrammatic representation of the mold tooling 60 is illustrated in FIGS. 3 and 4 and includes a lower base portion 64 and a separable upper lid portion 66 that are hinged or otherwise supported for movement relative to one another to open and close the mold cavity 58 therebetween according to conventional, foam molding practice. The lid or cover 66 of the mold apparatus 60 is adapted to support the intermediate component assembly 56 within the mold cavity 58. One means of releasably supporting the intermediate assembly 56 on the mold lid 66 is illustrated in the drawings and comprises a plurality of spring plungers 68, each having a latch element 70 supported within a barrel 72 and biased constantly outwardly by a compression spring 74 into releasable locking engagement with a coacting shoulder 76 of the intermediate component assembly 56. The barrel 72 of each plunger 68 is accommodated in a transverse opening 78 of the lid and secured in place by a pair of retaining nuts 80, 82 threaded onto the barrels 72 and confronting opposite abutment shoulders 84, 86 of mold lid 66. The spring 68 and latch element 70 are accommodated in a blind bore 88 of the barrel 72 and retained against removal by a flange 90 provided on the nut 80.

The shoulder 76 of the intermediate assembly 56 preferably takes the form of an annular half-round locking rib that extends around the wall 36 of the backing panel 32 and projects radially inwardly of the sidewall 36 beyond the outwardly biased locations of the latch elements 70. The mounting of the intermediate assembly 56 on the mold lid 66 is carried out by simply forcing the assembly 56 onto the mold lid 66 causing the rib 76 to pass by the latches 70 of the spring plunger 68, which are deflected inwardly when engaged by the rib 76 and then returned outwardly as the rib 76 passes by to hold the assembly 56 releasably on the molded 66, as illustrated in FIG. 3. Once mounted, the intermediate assembly 56 is positioned in the mold cavity 58 by closing the upper and lower mold portions 64, 66, as illustrated in FIG. 4.

The insert panel 18 includes a pour hole opening, 96 provided by a collar 97 that projects from the foam space 30 upwardly through an aligned opening 98 in the backing panel 32 for receiving precursors of polyurethane foam injected in a liquid flowable state from a foam pour nozzle 100 directly into the foam space 30 where they are permitted to react and expand in known manner to flow throughout and fill the foam space to produce the expanded foam urethane foam core 62.

As the foam reacts, any gases and excess foam material contained within the foam space 30 are permitted to escape in a controlled manner through the constricted gap 40 into the adjacent overflow chamber 42. As illustrated best in FIG. 6, the pressure exerted by the gases and excess foam against the return flap 16 deflects the return flap 16 upwardly against the backing panel 32, allowing the gases and excess foam to flow through the small space 102 between the return flap 16 and the first encountered ridge projection 46 and is directed into the adjacent overflow chamber 42 between the ridge projections 44, 46. As pressure builds in the chamber 42, the return flap 16 is deflected away from a second encountered ridge projection 46 against the backing panel 32 providing a small space 104 therebetween through which the gases are permitted to escape from the chamber 42 into the adjacent venting space 37 between the panels 18, 32. Although excess foam could also escape into the vent space, it is preferable to design the overflow chamber 40 sufficiently large to accommodate most if not all of the quantity of expected overflow foam.

In addition to permitting the controlled passage of gases and excess foam through the gap 40 into the overflow chamber 42, the return flap 16 further serves to seal the gap 40 against external leakage of such excess foam out of the assembly 56. As the flap 16 is deflected upwardly against the backing panel 32 during passage of the gases and excess foam through the gap, the tortuous shape of the return flap 16 nests with the tortuous ridge projection 48 of the backing panel 32 to provide a labyrinth-like barrier or seal to prevent the excess foam from leaking out of the assembly past the return flap 16 and backing panel 32. Thus, the three-point foam control provided the ridge projections 44, 46, and 48 and the interposed return flap 16 enables the controlled venting and release of excess foam and gases from the foam space in order to ensure full development of the foam core 62 while further containing such excess foam wholly within the confines of the component 10 so as not to allow it to escape and leak onto the exposed exterior face of the shell 14 or the exposed backside 104 of the backing panel 32.

Once the foam 62 has cured within the foam space 30, the cavity 58 is opened and the completed component 10 dismounted from the mold lid 66 by pulling on the component with sufficient force to disengage the locking rib 92 from the spring plunger 68.

It is contemplated that other means could be used to releasably mount and hold the intermediate assembly 56 and the mold lid 66, such as vacuum cups (not shown) carried by the molded 66 for engaging the backside 102 of the backing panel 32 to releasably support the intermediate assembly 56 on the mold lid 66.

While certain specific and preferred embodiments of the invention have been described in detail here and above, those skilled in the art will recognize that various modifications a nd variations of the present invention are possible in light of the above teachings in hence may be practiced otherwise in a specifically described herein and yet remain within the scope of the appended claims, which were intended to include the equivalence of such embodiments.

We claim:

1. A method of making a vehicle interior trim component comprising the steps of:
    preparing a shell of flexible material having a peripheral return flap;
    preparing an insert panel having inner and outer sides and a peripheral edge;
    positioning the shell in spaced relation over the inner side of the insert and extending the shell return flap around the edge and to the outer side of the insert to envelop a foam space between the shell and the insert panel;
    joining a backing panel to the insert panel to provide an overflow chamber between the panels and a peripheral gap between the foam space and chamber, and capturing the return flap of the shell within the gap;
    introducing foam core material in a flowable state into the foam space and allowing the material to flow throughout and fill the space to produce a foam core therein, the return flap of the shell being so supported within the gap as to permit any gases and excess foam contained in the foam space to pass through the gap between the return flap and the insert and into the overflow chamber to relieve the foam space of such gases and excess foam while sealing the gap against external leakage of such excess foam past the return flap and backing panel;
    supporting the return flap of the shell within the peripheral gap such that the return flap deflects toward and seals against the backing panel as the gases and excess foam passes through the gap to prevent the external leakage of such excess foam past the return flap and backing panel; and
    providing at least one peripheral ridge projection on the backing panel and positioning the return flap of the shell within the gap such that it extends over the ridge projection during passage of the gases and excess foam through the gap to effect a foam-tight seal between the return flap and the backing plate to prevent the leakage of foam therepast.

2. In the method of claim 1, providing a pair of accompanying ridge projections on the insert panel spaced apart and arranged on opposite sides of the backing plate ridge when the panels are joined to provide a tortuous transverse shape to the gap, and providing a tortuous transverse shape to the flap return of the shell conforming generally to that of the gap.

3. In the method of claim 2, forming a channel between the pair of ridge projections on the insert panel to provide the overflow chamber aligned opposite the ridge projection of the backing panel and extending the return flap of the shell across the channel.

4. In the method of claim 2, preshaping the return flap of the shell into the tortuous configuration before capturing the return flap between the panels.

5. In the method of claim 3, forming a vent space between the panels adjacent the overflow chamber and directing gases from the chamber into the vent space.

6. A method of making a vehicle interior trim component comprising the steps of:
    preparing a shell of flexible material having a peripheral return flap;
    preparing an insert panel having inner and outer sides and a peripheral edge;
    positioning the shell in spaced relation over the inner side of the insert and extending the shell return flap around the edge and to the outer side of the insert to envelop a foam space between the shell and the insert panel;
    joining a backing panel to the insert panel to provide an overflow chamber between the panels and a peripheral gap between the foam space and chamber, and capturing the return flap of the shell within the gap; and
    introducing foam core material in a flowable state into the foam space and allowing the material to flow throughout and fill the space to produce a foam core therein, the return flap of the shell being so supported within the gap as to permit any gases and excess foam contained in the foam space to pass through the gap between the return flap and the insert and into the overflow chamber to relieve the foam space of such gases and excess foam while sealing the gap against external leakage of such excess foam past the return flap and backing panel;
    providing mold tooling having a mold cavity and an upper openable lid portion for gaining access to the cavity and releasably mounting the assembly of the shell and panels on the upper lid portion to support the assembly in the mold cavity;
    providing a plurality of spring plungers on the lid portion and a coating retaining shoulder on the backing panel, and pressing the retaining shoulder of the backing panel into releasable engagement with the spring plungers to support the assembly on the lid portion; and
    forming an annular rib on the backing plate to provide the retaining shoulder and forcing the rib past the spring plungers to mount the assembly on the lid portion of the mold.

* * * * *